(12) United States Patent
Sammut

(10) Patent No.: US 10,701,872 B1
(45) Date of Patent: Jul. 7, 2020

(54) SOD HARVESTERS

(71) Applicant: Daniel Sammut, New South Wales (AU)

(72) Inventor: Daniel Sammut, New South Wales (AU)

(73) Assignee: TRE BRO HOLDING, INC, Billings, MT (US)

( * ) Notice: Subject to any disclaimer, the term of this patent is extended or adjusted under 35 U.S.C. 154(b) by 372 days.

(21) Appl. No.: 15/732,382

(22) Filed: Nov. 2, 2017

(51) Int. Cl.
*A01G 20/15* (2018.01)
*A01G 20/10* (2018.01)

(52) U.S. Cl.
CPC .............. *A01G 20/15* (2018.02); *A01G 20/10* (2018.02); *B65G 2201/0232* (2013.01); *B65G 2207/14* (2013.01)

(58) Field of Classification Search
CPC ...................................................... A01G 20/15
USPC ...................................................... 172/19, 20
See application file for complete search history.

(56) References Cited

U.S. PATENT DOCUMENTS

| | | | | |
|---|---|---|---|---|
| 2,224,789 A * | 12/1940 | Kurtz et al. | .............. | B65F 3/18 414/472 |
| 3,375,877 A * | 4/1968 | Pasinski et al. | ....... | A01G 20/12 172/19 |
| 3,387,666 A * | 6/1968 | Hadfield | ................ | A01G 20/12 172/20 |
| 4,777,890 A * | 10/1988 | Raymond | .............. | A01G 20/10 111/100 |
| 4,832,130 A * | 5/1989 | Brouwer et al. | ....... | A01G 20/12 172/19 |
| 4,966,239 A | 10/1990 | Hutchison | | |
| 5,165,617 A | 11/1992 | Vuuren | | |
| 6,364,027 B1 | 4/2002 | Tvetene | | |
| 7,000,706 B1 * | 2/2006 | Dover | .................... | A01G 20/12 172/19 |
| 8,813,861 B2 | 8/2014 | Stenfanski | | |
| 9,648,797 B2 | 5/2017 | Sammut | | |
| 2005/0274530 A1 * | 12/2005 | Brouwer et al. | ....... | A01G 20/15 172/19 |

* cited by examiner

*Primary Examiner* — Thomas B Will
*Assistant Examiner* — Joel F. Mitchell
(74) *Attorney, Agent, or Firm* — Johnson & Phung LLC

(57) ABSTRACT

A sod harvester and a method for maintaining the integrity of a sod roll during sod roll transfer with the sod harvester having a first power assist rotatable sod roll cradle containing a set of spokes with opposed faces that laterally engage and dynamically cradle a sod roll as the sod roll falls from an upper conveyor to a lower conveyor so that a further set of opposed faces on the rotatable spokes laterally engage a further sod roll on an upper conveyor through a torque applied to the sod cradle by a low power hydraulic motor as the sod roll falls from the upper conveyor to the lower conveyor with the cycle repeated with each sod roll that is discharged from the upper conveyor to thereby maintain the integrity of the sod rolls within the sod harvester.

17 Claims, 4 Drawing Sheets

SOD HARVESTERS

CROSS REFERENCE TO RELATED APPLICATIONS

None

STATEMENT REGARDING FEDERALLY SPONSORED RESEARCH OR DEVELOPMENT

None

REFERENCE TO A MICROFICHE APPENDIX

None

BACKGROUND OF THE INVENTION

A typical sod harvester contains a set of internal sod stations and sod transfer mechanisms that transfer a sod roll from station to station within the sod harvester before stacking the sod rolls on a sod pallet, which is then left on the field for later pickup. Typically, the sod harvester cuts and then winds a flat sod slab into a spiral sod roll as the sod slab moves toward a discharge end of a sod elevator. The sod roll is held together by the friction between the wound layers of the sod slab and the gravitational forces acting on the sod slab. One of the drawbacks in handling such sod rolls is that the integrity of the sod roll may deteriorate as the sod harvester transfers the sod rolls within the sod harvester. In one method the sod roller orientates the cut end of the slab to inhibit unwinding of the sod roll as shown in U.S. Pat. No. 9,648,797. Another example of a method to prevent a sod roll from unwinding in a sod accumulator is shown in U.S. Pat. No. 8,813,861, which shows a topside sod roller located downstream of the sod roll mechanism and above the sod rolls on the sod accumulator. In operation the topside sod roller rolls over the top of each the sod rolls as the sod rolls lay on the accumulating conveyor in order to keep the sod rolls thereon from unwinding as the accumulating conveyor moves the sod rolls from one location to another. Unfortunately, the prior art topside roller fails to address the problem of sod roll integrity as the sod roll is transferred between stations in the sod harvester and, more specifically, to the problem of sod roll unwinding as the sod roll falls from a discharge end of one conveyor onto a lower accumulating conveyor.

SUMMARY OF THE INVENTION

A sod harvester for maintaining the integrity of a sod roll during sod roll transfer within a sod harvester with the sod harvester having a first power assist rotatable cradle containing a set of spokes with opposed faces that laterally engage and dynamically cradle a sod roll as the sod roll falls from an upper conveyor to a lower conveyor. Once the power assist rotatable cradle delivers the sod roll to a lower conveyor a further set of opposed faces on the rotatable spokes laterally engage a further sod roll on an upper conveyor through a torque applied to the sod cradle by a low power hydraulic motor. The process of cradling a sod roll as the sod roll falls from one conveyor to another conveyor is repeated with each sod roll that is discharged from the upper sod conveyor to thereby maintain the integrity of the sod rolls within the sod harvester.

DESCRIPTION OF THE PREFERRED EMBODIMENT

Figure 1:
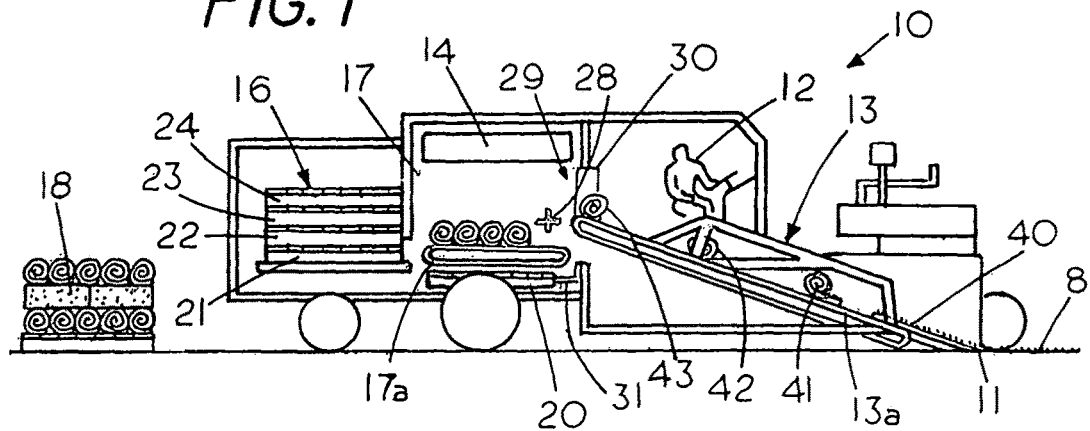
FIG. 1 is a side view of a sod harvester cutting sod slabs from a sod field and internally transferring the sod slabs in roll form onto a sod pallet for discharge on to the sod field.

FIG. 1 shows an operator 12 seated on a sod harvester 10 for on-the-go cutting and stacking a plurality of sod rolls for field pickup during a forward motion of the sod harvester. In this example sod harvester 10 includes a first station 13 having a sod-cutting blade 11 for cutting a sod slab 40 free from a sod field 8 and an elevator 13a for elevating the sod slabs thereon to a second station 17 as the sod harvester moves forward. FIG. 1 shows multiple sod slabs 41, 42 and 43 located on the sod elevator with each of the sod slabs formed into a sod roll and each having a free flap end that may unwind during the transfer of sod rolls within the sod harvester.

Thus as shown in FIG. 1 sod harvester 10 comprises a first sod station 13 comprising an elevator 13a for dispensing a sod roll, a second sod station 17 for receiving the sod roll; and a sod cradle 28 for cradling the sod roll to maintain the integrity of the sod roll as the sod roll is transferred from the first sod station 13 to the second sod station 17.

More specifically, in this example the sod harvester 10 includes a sod roll cradle 28 that inhibits or prevents sod rolls from unwinding during transfer of the sod roll to a second station, which comprises a sod accumulator 17 having a rotateable belt 17a that is located proximate a discharge end of elevator 13a. Once a sod roll falls onto accumulator belt 17a the top surface of the belt advances to the left to leave an empty space on the accumulator belt 17a to receive an additional sod roll from the first station 13. Typically, the process of loading a sod roll and rotating the belt continues until the accumulator belt 17a is full.

Located within sod harvester 10 is an overhead sod transfer mechanism or sod pick up head 14 for picking up sod rolls resting on accumulator 17 and transferring the sod rolls to a third station 29. An example of a sod transfer mechanism is shown in U.S. Pat. No. 6,296,063 and is hereby incorporated by reference.

Sod harvester 10 includes a pallet holder station 16 containing a stack of empty pallets 21, 22, 23, and 24 and a pallet lift station 29 with a sod pallet 20 supported by a vertically positionable pallet lift 30. Located behind the sod harvester 10 is a sod pallet 18.

In a typical sod harvesting process sod slabs are cut, rolled and stacked on a pallet for delivery to a remote work site, however, one of the difficulties encountered in sod harvesting is to maintain the sod rolls in a neat compact roll as the sod rolls travel through multiple stations before the sod rolls are eventually stacked on a pallet, which is discharged onto the field for pickup and delivery to a remote work site.

Figure 2:
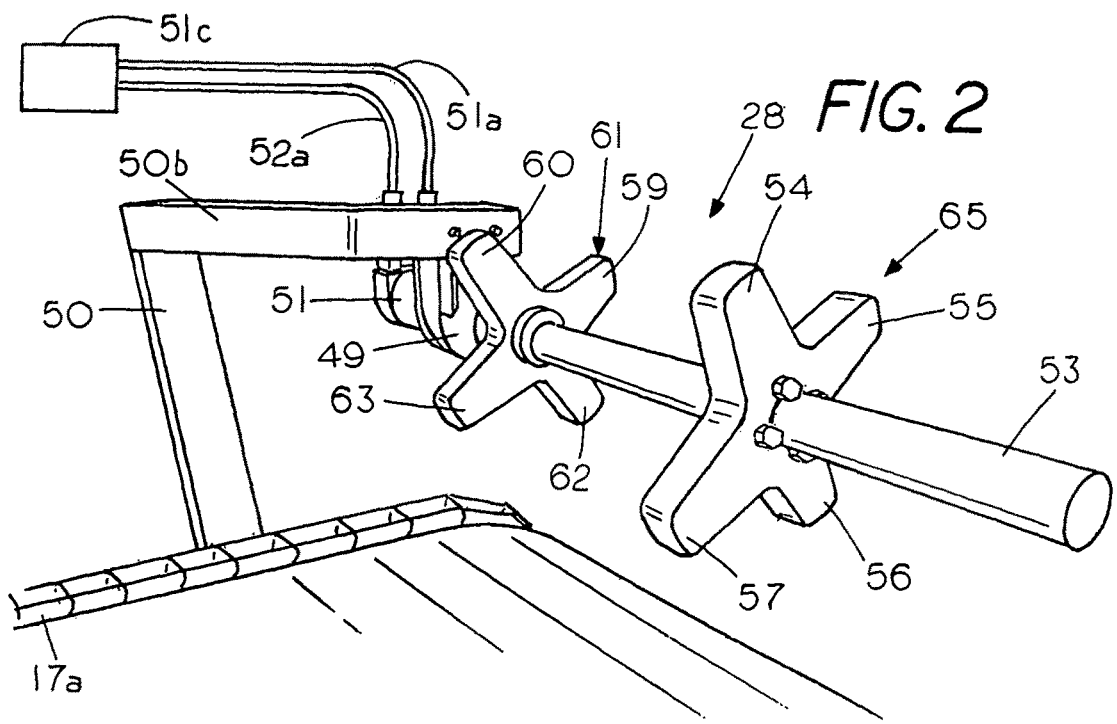
FIG. 2 is an isolated perspective view of a sod roll cradle containing a set of two spoke sod wheels.

FIG. 2 is an isolated view of a power assist sod cradle 28 that maintains the integrity of a sod roll as a sod roll falls from a discharge end of the sod elevator 13a onto a sod accumulator belt 17a. Sod cradle 28 includes a rotatable shaft 53, which supports a first spoke sod wheel 61 having a set of four spokes 59, 60, 63 and 62 an identical second spoke sod wheel 65 having a set of four spokes 54, 55, 56 and 57. Sod cradle 28 is supported by a pivotable post 50 and an arm 50b that contains a hydraulic motor 51 having a set of hydraulic lines 51a and 52a, which are connected to a hydraulic source 51c that supplies hydraulic fluid under pressure to hydraulic motor 51.

In this example, a low power hydraulic motor 51 supplies a clockwise rotational force to shaft 53 and spoke sod wheels 58 and 59 to maintain peripheral engagement of the spoke sod wheels with a sod roll as the sod roll falls from the sod elevator 13a onto the sod accumulator 17a. By low power hydraulic motor 51 it is understood that the rotational force applied to shaft 53 and sod wheels 61 and 65 by hydraulic motor 51 is such that shaft 53 rotates in a clockwise direction when the spoke wheels 58 and 59 are not in contact with a sod roll. When the spoke wheels 58 and 59 are in contact with a sod roll the torque generated by the hydraulic motor 51 is sufficient to urge or maintain the spoke wheels in contact with the sod roll without damaging the sod roll as the sod roll falls from the sod elevator 13 onto the sod accumulator belt 17a. However, the torque generated by the power assist hydraulic motor 51 is insufficient to overcome the movement of a sod roll in engagement with the spokes or to damage the sod rolls through engagement of the sod wheel spokes with the sod roll. Consequently, the torque generated by hydraulic motor 51 maintains spoke sod wheels 61 and 65 in engagement with sod roll to prevent the sod roll deterioration or unwinding without harming the sod roll. The motion of the sod roll against the sod wheel can either stop or stall rotation of the sod wheels since the torque generated by the hydraulic force is an assist force and not a displacement force. Thus, a feature of the invention is that the spoke sod wheels cradle a sod roll and function as a sod roll flap holding device as the sod roll is transferred between two stations within the sod harvester to prevent damage such as unwinding of the sod roll. The cradling is done without impeding the transfer motion of the sod roll and without damaging the sod roll. After the cradling of the sod roll discharging from the sod elevator a set of different spokes on the sod wheel rotationally engage a further sod roll to cradle the further sod roll as it falls onto the conveyor. Thus, a feature of the invention is that the power assist hydraulic motor 51, maintains a set of spokes on the sod wheels 61 and 65 in contact with the periphery of a sod roll to inhibit or prevent the sod roll deterioration such as unwinding of the sod rolls as the sod rolls continue to fall from a discharge end of the conveyor onto an accumulating conveyor 17a. The power assist hydraulic motor 51 also rotates or assists in rotation of the sod wheels 61 and 65 to bring a further set of spokes of sod wheels 61 and 65 into contact with a further sod roll on the sod elevator. Similarly, the further sod roll is cradled to prevent the further sod roll from unrolling as the further sod roll falls onto the accumulator. In this example, the power to hydraulic motor 51 is controlled through hydraulic line 51a and 52a, which can be controlled by operator 12. Although a hydraulic motor 51 is used as a torque limiter to prevent damage to the sod rolls while still powering the rotation of the spoke wheels it is envisioned that other types of torque limiters such as a friction drive torque limiter or a magnetic drive torque limiter may be used without departing from the spirit and scope of the invention.

In this example shown in FIG. 2 the sod cradle 28 includes a rotatable shaft 53, which is supported in housing 49 by a support arm 50 pivotally mounted (FIG. 4) in sod harvester 10 through a hinge 50d that allows the sod cradle 28 supported thereon to move up and down in order to maintain engagement with a sod roll as the sod roll discharges from the elevating conveyor 13a. In this example a tension spring 58 engages arm 50 and pot 50c to urge sod cradle 28 into the horizontal condition shown in FIG. 5. The use of a resilient mounted support for hydraulic motor 51 creates a downward force on cradle 28 as the sod roll falls to the accumulating conveyor. The downward force is such that a force generated by a sod roll as it leaves the sod elevator causes the arm 50b to flex upward thereby preventing the sod roll from being damaged as it enters into engagement with the sod cradle 28.

FIG. 2 shows sod cradle 28 includes two spoke sod wheels 58 and 59 with spoke sod wheel 58 including spokes 54, 55, 56 and 57. Similarly, spoke sod wheel 59 includes spokes 60, 61, 62 and 63. Although two spoke sod wheels are shown more or less spoke sod wheels may be used without departing from the spirit and scope of the invention. Similarly, while spoke sod wheels are shown other sod engagement members that cradle the sod roll as the sod roll falls from one conveyor to another may be used without departing from the spirit and scope of the invention.

In the example shown in FIG. 2 and FIG. 6 to FIG. 10 the resiliently mounted rotateable sod roll cradle 28 has at least two sod wheels 61 and 65 each having at least two sets of intersecting faces with the power assist hydraulic motor 51 rotationally urging one of the at least two sets of intersecting faces thereon into a cradling engagement of a sod roll on the sod elevator and maintaining the cradling engagement of the at least one of the at least two sets of intersecting faces with the sod roll as the sod roll falls onto the accumulating conveyor 17a. While two sod wheels are shown more or less sod rolls may be used without departing from the spirit and scope of the invention.

Figure 3:
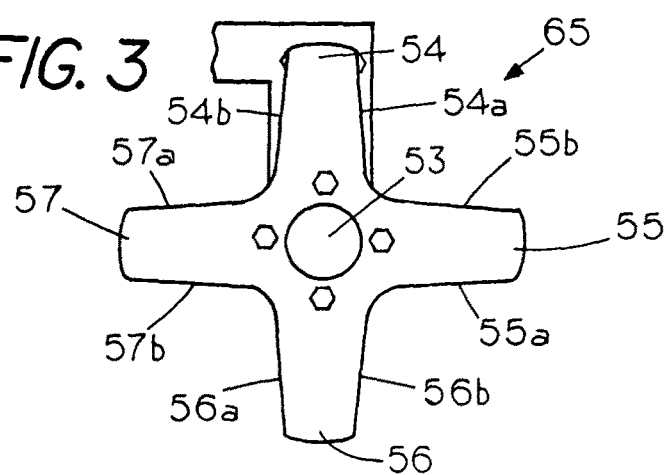
FIG. 3 is an isolated side view of a four spoke sod wheel.

FIG. 3 shows an end view of a first spoke sod wheel 58 having a set of four intersecting faces for engaging a peripheral portion of a sod roll with the spoke wheel 58 mounted on shaft 53. In this example shown a first spoke 54 has a face 54a and a second spoke 55 has a face 55b with face 54a and face 54b intersecting so that when the faces 54a and 54b are in contact with a periphery portion of a sod roll the sod roll therein is cradled therein and restrained from unwinding. Second spoke 55 has a second face 55a and a third spoke 56 has a first face 56b with the faces 55a and 56b also intersecting so that when the faces 55a and 56b are in contact with a periphery portion of a sod roll the sod roll therein is cradled therein and thus restrained from unwinding. Spoke 56 has a face 56*a* and spoke 57 has a face 57*b* with the faces 56*a* and 57*b* intersecting so that when the faces 56*a* and 57*b* are in contact with a periphery portion of a sod roll the sod roll is cradled therein and restrained from unwinding. Similarly, face 57*a* of sod spoke 57 intersects with face 54*b* of spoke 54 so that when the faces 54*a* and 55*b* are in contact with a peripheral portion of a sod roll the sod roll is cradle therein and restrained from unwinding. In this example there are four sets of intersecting faces on each of the sod wheels for intermittingly engaging and cradling a sod roll as the sod roll falls from a sod elevator to a sod conveyor but more or less spokes may be used without departing from the spirit and scope of the invention. In this example the end view of FIG. 3 shows the spoke wheels 61 and 65 are in rotational alignment with each other to both simultaneously engage or release a sod roll. In this example intersecting faces are located at right angles to each other. Although spokes are shown to form the cradle described herein other shape cradles such as an arcuate or a vee shaped cradle may be used that can engage and disengage from a sod roll as the sod roll completes its transfer between stations.

Figure 4:
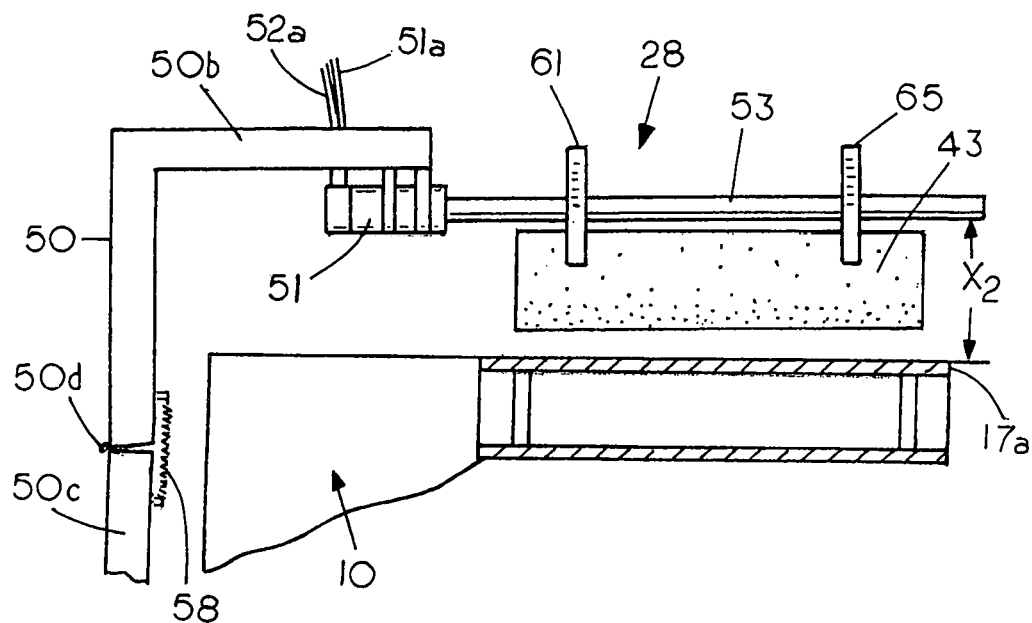
FIG. 4 is an isolated side view of a resiliently mounted sod cradle in the up position engaging a top side of a sod roll as the sod roll falls onto an accumulating conveyor.
Figure 5:
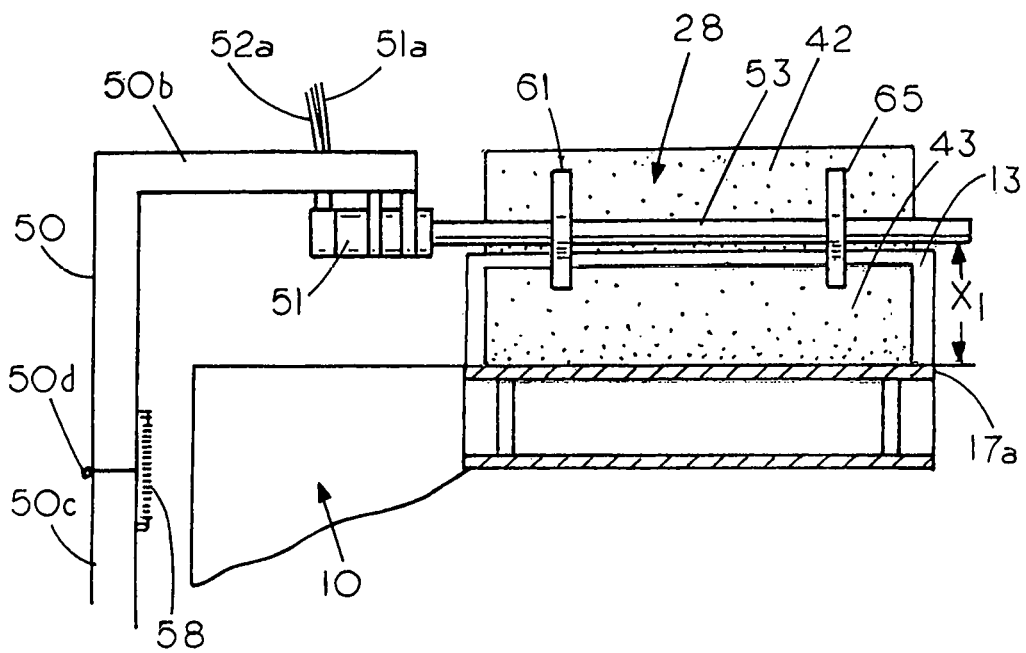
FIG. 5 is an isolated side view showing the resiliently mounted sod cradle in the down position engaging a top side of a sod roll on an accumulating conveyor.

FIG. 4 is an isolated view of a resiliently mounted sod cradle 28 in an up position with sod wheel 61 and sod wheel 65 engaging sod roll 43, which is falling toward accumulating conveyor 17*a*. Sod cradle 28 prevents unrolling of the sod roll as it falls onto conveyor 17*a* through the dynamic engagement of the sod roll 43 and the sod cradle 28. In this example the hydraulic motor 51, which mounts on a pivotable arm 50*b*, provides a torque to shaft 53, which rotates spoke wheels 61 and 65 into engagement with sod roll 43 without damaging the sod roll. That is, the rotational torque on shaft 53 through hydraulic motor 51 is sufficiently low so that the engagement between the spoke wheels 61, 65 and the sod roll 43 does not damage the sod roll. Note, in this position the arm 50*b* is tilted slightly upward as a result of the lateral engagement of the spoke wheels 61 and 65 with sod roll 43. That is, the rotational torque applied to shaft 53 causes the spoke wheels 61 and 65 to laterally engage the sod roll 43 and to ride up to the top position shown in FIG. 4. To accommodate the riding up onto the sod roll 43 the post 50 includes a hinge 50*d* and a base 50*c* with a tension spring 58, which normally urge the post 50 and brace 50*c* into a vertical position. Once the spoke wheels 61 and 65 are in engagement with the sod roll 43 tension spring 58 brings the post 50 and base 50*c* to a vertical condition shown in FIG. 5 as the sod roll completes its fall onto conveyor 17*a* while maintaining contact with the sod roll therein. As shown in FIG. 4 and FIG. 5 the resiliently mounted sod roll cradle 28 includes an arm 50 cantileverly supporting the power assist hydraulic motor 51 with the arm exerting a downward force on the sod roll cradle 28.

FIG. 5 shows the sod cradle 28 in the down position where it maintains the sod roll on conveyor 17*a* to prevent unwinding of the sod roll 43. Thus, a feature of the sod cradle 28 is that the sod cradle maintains a downward force on the sod roll therein to maintain the integrity of the sod roll but at the same time the sod cradle 28 also moves upward to allow a further sod roll 42 to enter beneath the sod cradle 28 where a further set of spokes on the sod wheels create a dynamic cradling of the further sod roll.

To illustrate the dynamic cradling of a sod roll as the sod roll falls from one conveyor to another reference should be made to FIG. 6 to FIG. 10 which illustrate in schematic form how the sod cradle 28 engages with sod rolls as sod rolls are transferred from one station to another station within the sod harvester.

Figure 6:
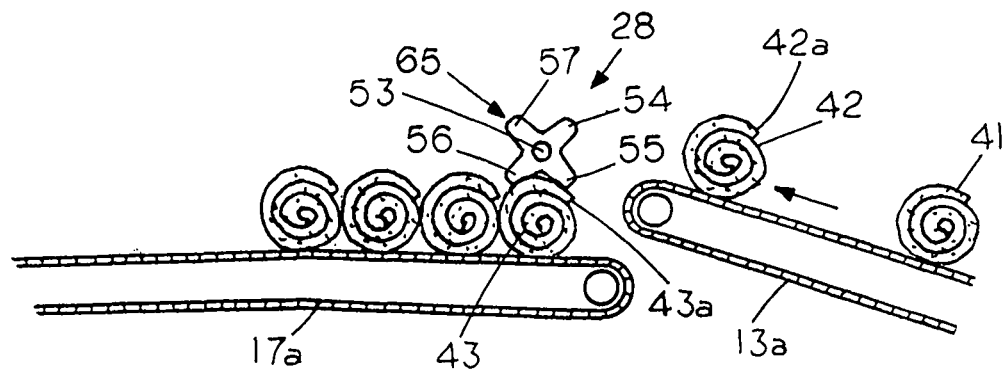
FIG. 6 is an isolated side view showing the resiliently mounted sod cradle in the down position as the sod cradle engages the sod roll on the accumulating conveyor.

FIG. 6 is an isolated side view showing the resiliently mounted sod cradle 28 in the down position of a transfer cycle as spokes 55 and 56 of spoke sod wheel 65 as well as the spokes of sod wheel 61 (see FIG. 4 and FIG. 5) peripherally engage the top portion of sod roll 43 on the accumulating conveyor 17*a*. In this portion of the transfer cycle spokes 54 and 57 are not in engagement with the sod roll 43. The arrow indicates that the sod roll 42, with a flap end 42*a* on conveyor 13 is advancing toward the discharge end of conveyor 13 but has not reached the end of conveyor 13 where it will interact with the sod cradle 28.

Figure 7:
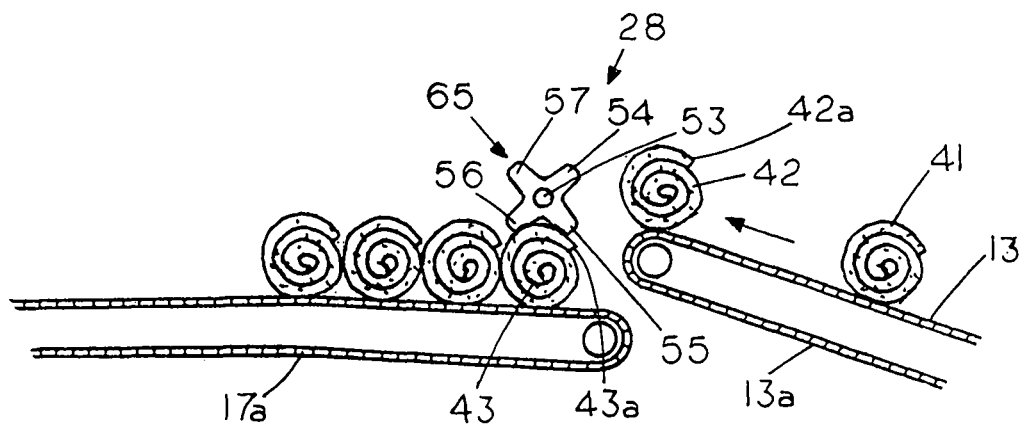
FIG. 7 is an isolated side view showing the resiliently mounted sod cradle in the down position with the sod cradle engaging the sod roll on the accumulating conveyor as a further sod roll advance toward the sod cradle.

FIG. 7 is an isolated side view showing a later portion of the sod roll transfer cycle with both the sod cradle 28 and the sod roll 43 in the same position as in FIG. 6 while the sod roll 42, which is on conveyor 13 has advanced toward the discharge end of conveyor 13. Normally, the sod roll 42 would be allowed to fall onto conveyor 17*a*, however, in the dynamic transfer cycle using the sod cradle 28 described herein the sod roll 42 interacts with the sod cradle 28 as the sod roll 42 falls from sod elevator 13.

Figure 8:
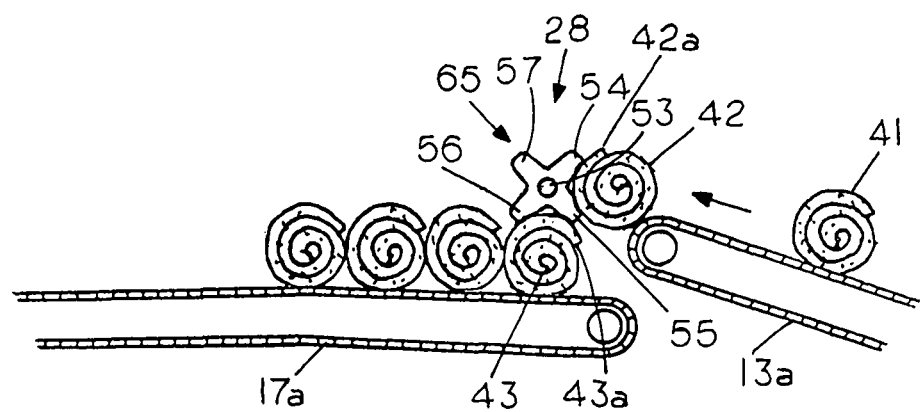
FIG. 8 is an isolated side view showing the resiliently mounted sod cradle in the down position as the sod cradle laterally engages the further sod roll discharging from the sod elevating conveyor.

FIG. 8 shows a further step in the sod transfer cycle that shows that conveyor 13 has advanced and that sod roll 42 has fallen off the end of conveyor 13. When sod roll 42 falls it comes into lateral contact with spokes 54 and 55 of sod wheel 58 as well as spokes 62 and 69 of spoke wheel 61 to prevent sod roll flap 42*a* from unwinding from sod roll 42. As the sod roll 42 engages the spokes on the spoke wheels 61 and 65 the rotational torque applied to shaft 53 through the low power hydraulic motor 51 urges the spoke wheels 61 and 65 to rotate in a clockwise direction to maintain contact with sod roll 42 while the weight of the falling sod roll 42 also urges the sod wheels 61 and 65 to rotate in a clockwise direction.

Figure 9:
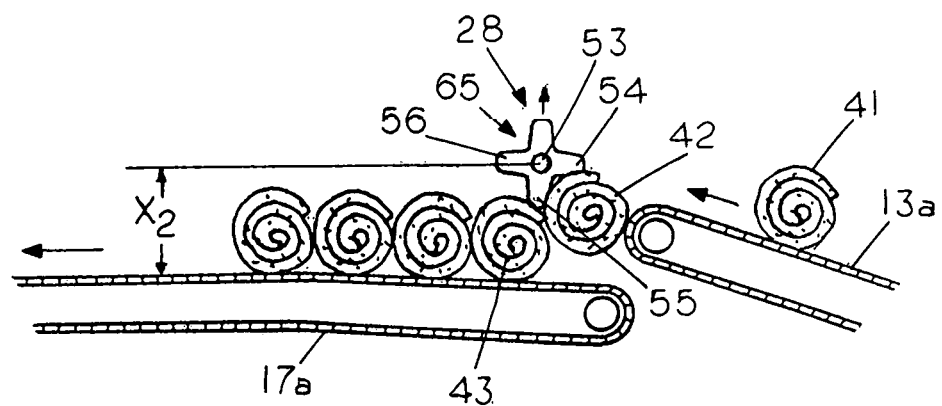
FIG. 9 is an isolated side view showing both the sod cradle and the further sod roll, which is being discharged from the sod elevating conveyor, in an up position with the sod cradle in lateral rolling engagement of the sod roll as the sod roll is falling onto the accumulating conveyor.

FIG. 9 shows a later portion of a sod transfer cycle with sod roll 42 continuing to fall as sod wheel spokes 55 and 56 have disengaged from sod roll 43 while sod wheel spokes 55 and 54 are in the process of rolling upward onto sod roll 42. Note, FIG. 9 shows that the sod roll 42 has not yet fallen onto the sod accumulator 17*a* and that sod accumulator conveyor 17*a* is moving laterally to the left to place the sod rolls thereon under sod pickup head 14. To accommodate the entry of sod roll 42 onto accumulator 17*a* the shaft 53 raises upward a distance denoted by $X_2$, which is also as illustrated in FIG. 4. In this portion of the sod transfer cycle the resilient pivotable arm 50*b* allows the sod wheel spoke 55 and sod wheel spoke 54 to be brought into lateral cradling engagement with sod roll 42 while sod wheel spokes 55 and 56 disengage from sod roll 43. That is, as the sod wheel 58 rotates in a clockwise direction causing the spokes 55 and 54 to move to a partial top position on sod roll 42, which is illustrated in FIG. 9. The resilient support for arm 50*b* provides for a downward cradling pressure to be maintained on the incoming sod roll 42 even though the sod wheels 65 and 61 needs to be elevated in order to allow entry of an a further sod roll beneath the sod cradle 28.

Figure 10:
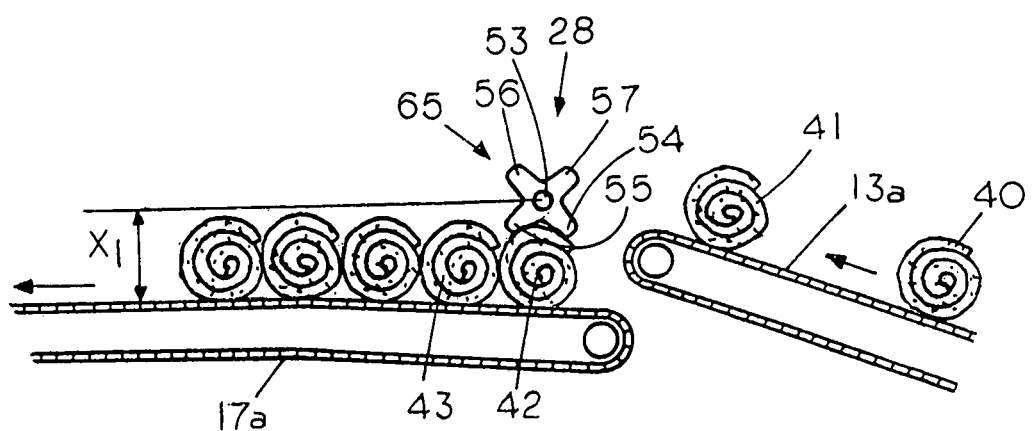
FIG. 10 is an isolated side view showing the resiliently mounted sod cradle in the down position holding the sod roll on the accumulating conveyor as it waits for the sod elevator to delivery another sod roll to the sod cradle.

FIG. 10 shows the completion of the sod transfer cycle with the sod cradle 28 in the down position as denoted by vertical distance $X_1$. (The down portion of the sod transfer cycle is also illustrated in FIG. 5 while the up portion of the sod cycle is illustrated in FIG. 4 with the vertical distance $X_2$ being greater than the vertical distance $X_1$.) In the down position the spokes 54 and 55 cradle the sod roll 42 to maintain the integrity of the sod roll 42. As shown by FIGS. 8, 9 and 10 the sod cradle 28 engages a sod roll on the sod elevator and cradles the sod roll with the spokes on the sod wheels with the sod cradle rotating as the sod cradle engages the sod roll and as the sod roll falls onto the accumulator.

In the example shown a hydraulic power source 51c (FIG. 2) connects to the hydraulic motor 51 with the hydraulic power supplied to the shaft insufficient to independently rotate the shaft 52, which extends transverse to the sod elevator (FIG. 1 and FIGS. 6-10) when the spokes of sod wheel 61 and 65 are in circumferential contact with a sod roll 42. The torque is sufficient to assist in rotating the spokes on the shaft 52 into partial circumferential contact with a top circumferential portion of the sod roll 42 before the sod roll 42 is discharged from the sod elevator. The circumferential cradle of the sod roll 42 as the sod roll 42 falls onto the accumulator conveyor 17a allows one to maintain the integrity of the sod roll as the sod roll is transferred from the sod elevator 13 to the accumulating conveyor 17a. As shown in FIG. 2 the sod cradle 28 comprise a rotatable sod roll cradle 28 with a first set of spokes 55, 56 and 62, 69 each having a sod engaging face and a second set of spokes 55, 54 and 59, 60 each having a sod engaging face with the second set of spokes rotationally engageable with a further sod roll on the sod elevator as the first set of spokes disengage from the sod roll.

While two sod wheels 61 and 65 are shown with each having four spokes a resiliently mounted rotateable sod roll cradle 28 may have one or more spoke wheels. As shown in FIG. 3 and FIG. 9 spoke wheel 65 includes at least two sets of spokes, (55, 56 and 57, 58) with each having at least two sets of intersecting faces, for example 54a and 55b, 55a and 56b, 56a and 57b; and 57a and 54b with each of the intersecting faces comprising a sod engaging faces with sod engaging faces located on opposite faces of the spokes. In operation power assist hydraulic motor 51 rotationally urges one of the at least two sets of intersecting faces, for example faces 54, 55 on spoke wheel 58 and faces 59 and 60 on spoke wheel 61 into a laterally cradling engagement of a sod roll 42 on the sod elevator 13. The power assist hydraulic motor 61 rotationally maintaining the cradling engagement of the at least two sets of intersecting faces with the sod roll 42 as the sod roll falls onto the accumulating conveyor 17a with the power assist hydraulic motor urging disengagement of the one of the at least two sets of intersecting faces with the sod roll 43 while urging two different sets of intersecting faces into laterally cradling engagement with a further sod roll on the sod elevator.

As illustrated by FIG. 2, FIG. 3 and FIG. 8 to FIG. 10 the resiliently mounted rotateable sod roll cradle 28 has at least two sod wheels 61 and 65 each having at least two sets of intersecting faces with the power assist hydraulic motor 51 rotationally urging one of the at least two sets of intersecting faces into a cradling engagement of a sod roll 42 (FIG. 8) on the sod elevator and maintaining the cradling engagement of the at least one of the at least two sets of intersecting faces with the sod roll as the sod roll falls onto the accumulating conveyor 17a (FIG. 9 and FIG. 10).

FIG. 6 to FIG. 10 illustrates the method of the invention which includes engaging a peripheral portion of the sod roll with a set of sod wheel spokes as well as step of cradling the first sod roll while cradling the second sod roll. More specifically the invention includes a method of maintaining the integrity of a sod roll as the sod roll is transferred between stations comprising cradling a sod roll by engaging a peripheral portion of the sod roll and maintaining a cradling engagement with the sod roll as the sod roll is transferred from an elevator 13a on a first station to an accumulating conveyor 17a on second station as shown in FIG. 6 to FIG. 10. As shown the method includes the step of exerting a radial cradling force on the sod roll through a low power hydraulic motor 51. Consequently, one can maintains partial circumferential contact with the sod roll as the sod roll rotates and falls onto the second station.

FIG. 8 and FIG. 9 illustrate the method includes the step of releasing the cradling engagement of the sod roll from a set of sod wheel spokes when the sod roll reaches the second station and cradles a further sod roll with a further set of sod wheel spokes while releasing the cradling engagement of the sod roll.

I claim:

1. A sod harvester for maintaining sod roll integrity during transfer of a sod roll between stations in a sod harvester comprising:
    a sod elevator for elevating and forming sod slabs into sod rolls;
    an accumulating conveyor located proximate a discharge end of the sod elevator;
    a power assist hydraulic motor comprising a low power hydraulic motor generating sufficient torque on a shaft supporting the sod cradle to maintain the sod cradle in pressure contact with the sod roll to prevent unwinding of the sod roll but insufficient torque to damage the sod roll;
    a resiliently mounted rotateable sod cradle having at least two sod wheels each having at least two sets of intersecting faces with said power assist hydraulic motor rotationally urging one of the at least two sets of intersecting faces into a cradling engagement of a sod roll on the sod elevator and maintaining the cradling engagement of the at least one of the at least two sets of intersecting faces with the sod roll as the sod roll falls onto the accumulating conveyor.

2. The sod harvester of claim 1 wherein a shaft carrying the rotatable sod roll cradle extends transverse to the sod elevator.

3. The sod harvester of claim 1 the resiliently mounted sod roll cradle comprises an arm cantileverly supporting the power assist hydraulic motor with the arm exerting a downward force on the sod roll cradle.

4. The sod harvester of claim 1 wherein the rotatable sod cradle comprises a first set of spokes each having a sod engaging face and a second set of spokes each having a sod engaging face with second set of spokes rotationally engageable with a further sod roll as the first set of spokes disengage from the sod roll.

5. The sod harvester of claim 4 wherein each of the spokes has a sod engaging face located on an opposite face of the spokes.

6. The sod harvester of claim 1 wherein the at least two intersecting faces are located at a right angle to one another.

7. A method of maintaining the integrity of a sod roll as the sod roll is transferred between stations comprising:
    cradling a sod roll by engaging a peripheral portion of the sod roll between opposed faces on a set of sod wheel spokes; and
    maintaining a cradling engagement between the opposed faces on the set of sod wheel spokes with the sod roll as the sod roll is transferred from a first station to a second station by maintaining the opposed faces on the set of sod wheel spokes in pressure contact with the sod roll with sufficient torque to prevent unwinding of the sod roll but insufficient torque to damage the sod roll.

8. The method of claim 7 including the step of exerting a radial cradling force on the sod roll through a low power hydraulic motor.

9. The method of claim 8 including the step of maintaining engagement with the sod roll includes maintaining partial circumferential contact with the sod roll as the sod roll rotates and falls onto the second station.

10. The method of claim 9 including the step of releasing the cradling engagement of the sod roll from the set of sod wheel spokes when the sod roll reaches the second station and cradling a further sod roll with a further set of sod wheel spokes while releasing the cradling engagement of the sod roll.

11. The method of claim 9 wherein the step of engaging a peripheral portion of the sod roll comprises engaging the sod roll with a set of sod wheel spokes.

12. The method of claim 9 including the step of cradling a first sod roll while cradling a second sod roll.

13. A sod harvester comprising:
a first sod station comprising an elevator for dispensing a sod roll;
a second sod station for receiving the sod roll; and
a sod cradle cradling the sod roll to maintain the integrity of the sod roll as the sod roll is transferred from the first sod station to the second sod station said sod cradle including a spoke sod wheel having a set of sod engaging faces thereon for sequentially engaging a further sod roll to maintain the integrity of the further sod roll as the further sod roll is sequentially transferred from the first sod station to the second sod station with a torque limiter preventing damage to the sod roll or the further sod roll as the sod roll and the further sod roll are transferred within the sod harvester where the torque limiter comprises a hydraulic motor generating a torque that is sufficient to urge or maintain the spoke sod wheel in contact with the sod roll without damaging the sod roll as the sod roll falls from the first sod station to a second sod station.

14. The sod harvester of claim 13 wherein the sod cradle is a power assist rotateable cradle.

15. The sod harvester of claim 14 where a torque generated by the power assist hydraulic motor is insufficient to overcome a movement of a sod roll in engagement with the spokes or to damage the sod rolls through engagement of the sod wheel spokes with the sod roll.

16. The sod harvester of claim 13 wherein the sod cradle is resiliently mounted and vertically displaceable.

17. The sod harvester of claim 13 wherein the sod cradle laterally engages the sod roll before rotating onto a top portion of the sod roll to thereby cradle the sod roll as the sod roll falls into the second station.

* * * * *